United States Patent
Ohmura

(10) Patent No.: US 11,514,903 B2
(45) Date of Patent: Nov. 29, 2022

(54) INFORMATION PROCESSING DEVICE AND INFORMATION PROCESSING METHOD

(71) Applicant: Sony Corporation, Tokyo (JP)

(72) Inventor: Junki Ohmura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 103 days.

(21) Appl. No.: 16/634,168

(22) PCT Filed: Jul. 25, 2018

(86) PCT No.: PCT/JP2018/027842
§ 371 (c)(1),
(2) Date: Jan. 27, 2020

(87) PCT Pub. No.: WO2019/026716
PCT Pub. Date: Feb. 7, 2019

(65) Prior Publication Data
US 2020/0234701 A1 Jul. 23, 2020

(30) Foreign Application Priority Data
Aug. 4, 2017 (JP) .............................. JP2017-152057

(51) Int. Cl.
*G10L 15/22* (2006.01)
*G10L 15/065* (2013.01)
(Continued)

(52) U.S. Cl.
CPC ............ *G10L 15/22* (2013.01); *G10L 15/065* (2013.01); *G10L 15/1822* (2013.01);
(Continued)

(58) Field of Classification Search
None
See application file for complete search history.

(56) References Cited

U.S. PATENT DOCUMENTS 9,978,396 B2 * 5/2018 Ekambaram ............ G10L 25/63
10,268,680 B2 * 4/2019 Takiel ................... G06F 40/205
(Continued)

FOREIGN PATENT DOCUMENTS

| JP | 2010-73191 A | 4/2010 |
|---|---|---|
| JP | 2015-176099 A | 10/2015 |
| WO | 2015/141700 A1 | 9/2015 |

OTHER PUBLICATIONS

International Search Report and Written Opinion dated Oct. 30, 2018 for PCT/JP2018/027842 filed on Jul. 25, 2018, 7 pages including English Translation of the International Search Report.
Communication pursuant to Article 94(3) EPC.

*Primary Examiner* — Richard Z Zhu
(74) *Attorney, Agent, or Firm* — Xsensus LLP

(57) ABSTRACT

The present technology relates to an information processing device and an information processing method that make it possible to generate interaction data with less cost.
Provided is the information processing device including a processor that generates, on the basis of interaction history information, a coupling context to be coupled to a context of interest to be noticed among a plurality of contexts. This makes it possible to generate interaction data with less cost. The present technology is applicable as server-side service of a voice interaction system, for example.

10 Claims, 14 Drawing Sheets

(51) Int. Cl.
*G10L 15/18* (2013.01)
*G10L 15/06* (2013.01)
*G06F 40/295* (2020.01)
*G06F 40/284* (2020.01)
*G06F 40/289* (2020.01)
*G06F 40/279* (2020.01)
*G06F 40/30* (2020.01)
*G06F 40/56* (2020.01)
*G06F 40/35* (2020.01)

(52) U.S. Cl.
CPC .......... *G06F 40/279* (2020.01); *G06F 40/284* (2020.01); *G06F 40/289* (2020.01); *G06F 40/295* (2020.01); *G06F 40/30* (2020.01); *G06F 40/35* (2020.01); *G06F 40/56* (2020.01); *G10L 2015/0631* (2013.01); *G10L 2015/228* (2013.01)

(56) References Cited

U.S. PATENT DOCUMENTS

| | | | |
|---|---|---|---|
| 2003/0167167 A1* | 9/2003 | Gong | G10L 15/22 704/250 |
| 2005/0055321 A1* | 3/2005 | Fratkina | G06F 16/954 706/45 |
| 2005/0105712 A1* | 5/2005 | Williams | H04M 3/5166 379/265.02 |
| 2006/0149544 A1* | 7/2006 | Hakkani-Tur | G10L 15/22 704/236 |
| 2015/0039292 A1* | 2/2015 | Suleman | G06F 16/285 704/9 |
| 2016/0042735 A1* | 2/2016 | Vibbert | G10L 15/222 704/257 |
| 2016/0163311 A1* | 6/2016 | Crook | G10L 15/183 704/275 |
| 2017/0365250 A1* | 12/2017 | Sarikaya | G06F 40/35 |
| 2018/0204573 A1* | 7/2018 | Iwasa | G10L 15/30 |
| 2018/0307675 A1* | 10/2018 | Akkiraju | G06N 20/00 |
| 2020/0184383 A1* | 6/2020 | Mehta | G06N 3/04 |

* cited by examiner

INFORMATION PROCESSING DEVICE AND INFORMATION PROCESSING METHOD

CROSS-REFERENCE TO RELATED APPLICATIONS

The present application is based on PCT filing PCT/JP2018/027842, filed Jul. 25, 2018, which claims priority to JP 2017-152057, filed Aug. 4 2017, the entire contents of each are incorporated herein by reference.

TECHNICAL FIELD

The present technology relates to an information processing device and an information processing method, and specifically to an information processing device and an information processing method that make it possible to generate interaction data with less cost.

BACKGROUND ART

In recent years, use of interaction agents have been started as voice interaction systems for interactions with people in various field. In a case of making a high-performance interaction agent, it is necessary to use sufficient interaction data and develop the interaction agent that makes it possible to achieve natural interactions like interactions between actual people.

For example, a technology disclosed in PTL 1 has been known as a technology of generating an interaction corpus. According to the technology disclosed in PTL 1, dialogue among two or more users such as a chat is used and the interaction corpus is generated on the basis of an interaction related to the dialogue.

CITATION LIST

Patent Literature

PTL 1: Japanese Unexamined Patent Application Publication No. 2008-299754

SUMMARY OF THE INVENTION

Problems to be Solved by the Invention

Meanwhile, in the case of making the high-performance interaction agent, it is necessary to use sufficient interaction data. However, a lot of manpower and time are necessary to collect much interaction data and to generate data of interaction scenarios customized for particular purposes, and this results in a huge amount of cost.

The present technology has been made in view of the above described situations. The present technology makes it possible to generate interaction data with less cost.

Means for Solving the Problem

An information processing device according to one aspect of the present technology is an information processing device including: a processor that generates, on the basis of interaction history information, a coupling context to be coupled to a context of interest to be noticed among a plurality of contexts.

The information processing device according to the one aspect of the present technology may be an independent device or may be an internal block included in a device.

An information processing method according to one aspect of the present technology is an information processing method that is performed by an information processing device, the method including: generating, on the basis of interaction history information, a coupling context to be coupled to a context of interest to be noticed among a plurality of contexts.

In the information processing device and the information processing method according to the aspects of the present technology, the coupling context to be coupled to the context of interest to be noticed is generated among a plurality of contexts on the basis of the interaction history information.

Effects of the Invention

According to an aspect of the present technology, it is possible to generate interaction data with less cost.

It is to be noted that the effects described here are not necessarily limited, and any effect described in the present disclosure may be exhibited.

MODES FOR CARRYING OUT THE INVENTION

Embodiments of the present technology are described below with reference to drawings. It is to be noted that the description is given in the following order.

1. Configuration of System
2. Embodiments of Present Technology
3. Modification Examples
4. Configuration of Computer

1. Configuration of System (Configuration of Voice Interaction System)

Figure 1:
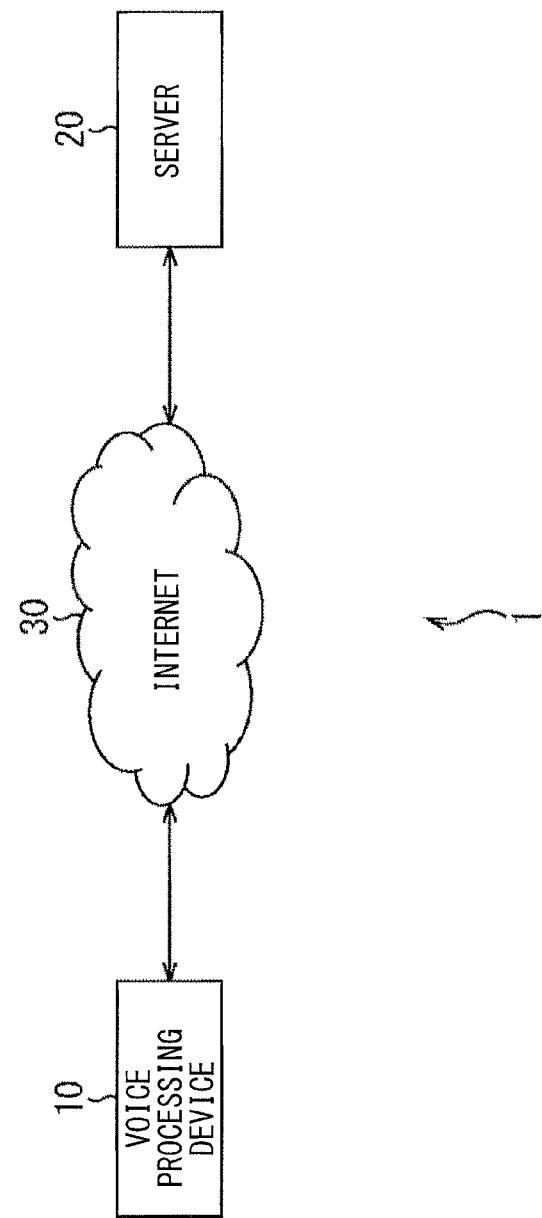
FIG. 1 is a block diagram illustrating a configuration example of a voice interaction system to which the present technology is applied.

FIG. 1 is a block diagram illustrating a configuration example of a voice interaction system to which the present technology is applied.

A voice interaction system 1 includes a voice processing device 10 and a server 20. The voice processing device 10 is installed on a local side and functions as a user interface of voice interaction service. The server 20 is installed on a cloud side such as a data center and performs processing for achieving a voice interaction function (such as an interaction agent).

In the voice interaction system 1, the voice processing device 10 and the server 20 are coupled to each other via the Internet 30.

The voice processing device 10 includes, for example, a speaker that makes it possible to couple to a network such as a home LAN (local area network). The speaker is also referred to as so-called smart speaker, or the like. Such a speaker makes it possible to reproduce music, and operate, for example, equipment such as lighting equipment and air conditioning equipment by voice.

It is to be noted that the voice processing device 10 is not limited to the speaker. For example, the voice processing device 10 may be configured as mobile equipment such as a smartphone or a mobile phone, or equipment such as a tablet-type computer.

The voice processing device 10 makes it possible to provide a user with (the user interface of) the voice interaction service in cooperation with the server 20 via the Internet 30.

In other words, the voice processing device 10 collects voice (user utterance) from the user, and transmits data of the voice to the server 20 via the Internet 30. In addition, the voice processing device 10 receives processing data (system response) transmitted from the server 20 via the Internet 30, and outputs voice corresponding to the processing data.

The server 20 is a server that provides cloud-based voice interaction service. The server 20 performs voice recognition processing for converting the voice data transmitted from the voice processing device 10 via the Internet 30, into text data.

In addition, the server 20 performs processing such as interaction processing in accordance with intention of the user on the text data, and transmits processing data (system response) obtained as a result of the processing to the voice processing device 10 via the Internet 30.

(Configuration of Voice Processing Device)

Figure 2:
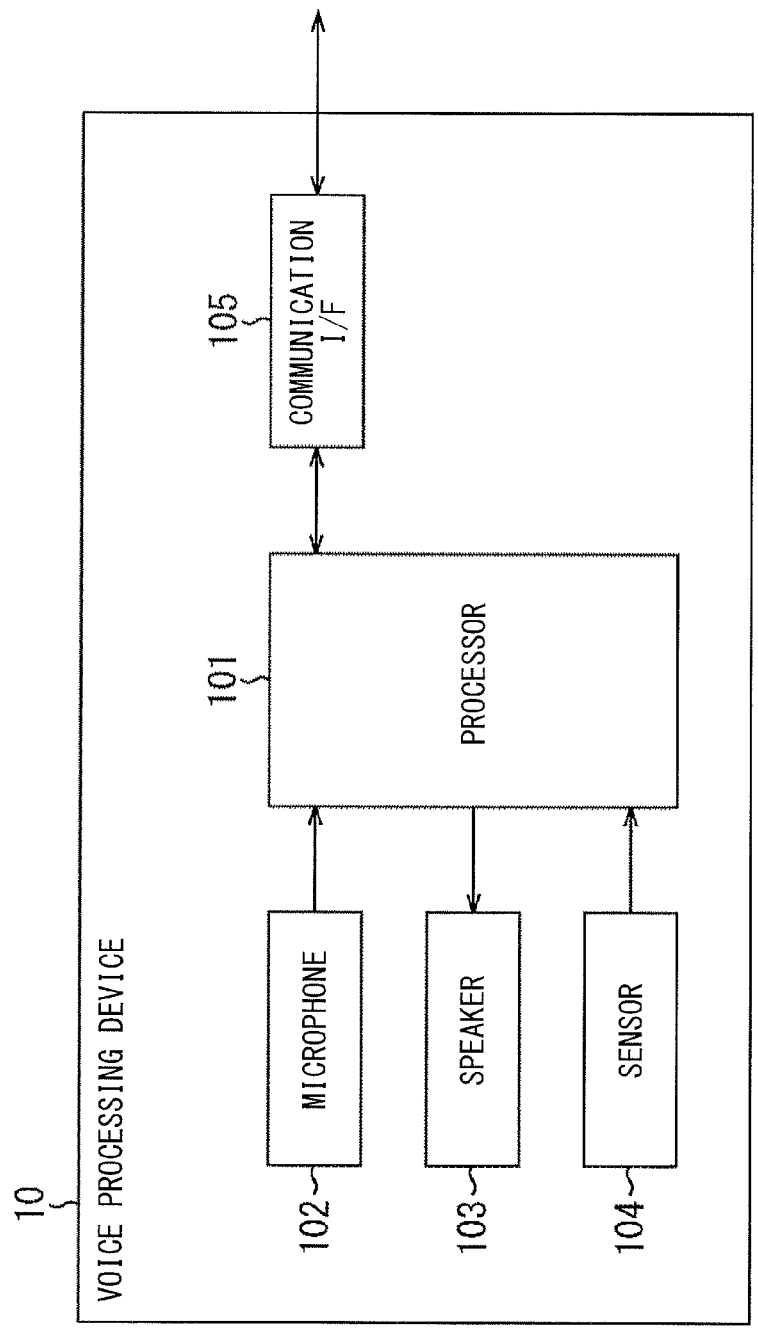
FIG. 2 is a block diagram illustrating a configuration example of a voice processing device.

FIG. 2 is a block diagram illustrating a configuration example of the voice processing device 10 illustrated in FIG. 1.

With reference to FIG. 2, the voice processing device 10 includes a processor 101, a microphone 102, a speaker 103, a sensor 104, and a communication I/F 105.

The processor 101 includes, for example, a CPU (central processing unit), a microprocessor, or the like. The processor 101 operates as a main processor in the voice processing device 10, such as various kinds of arithmetic processing and operation control of respective units.

The microphone 102 is equipment (sound collection equipment) that converts external sound into an electrical signal. The microphone 102 supplies an audio signal obtained through the conversion to the processor 101.

The speaker 103 is equipment that outputs sound by converting an electrical signal into physical vibration. The speaker 103 outputs sound corresponding to the audio signal supplied from the processor 101.

The sensor 104 includes various kinds of sensors. The sensor 104 performs sensing and supplies sensor information (sensor data) corresponding to a sensing result to the processor 101.

For example, the sensor 104 may include various kinds of sensors such as an image sensor that captures an image of a subject, a magnetic sensor that detects magnitude and a direction of a magnetic field, an acceleration sensor that detects acceleration, a gyro sensor that detects an angle (posture), angular velocity, and angular acceleration, a proximity sensor that detects an adjacent object, or a biosensor that detects biological information such as a finger print, an iris, or a pulse.

In addition, the sensor 104 may include a sensor for measuring an ambient environment such as a temperature sensor that detects temperature, a humidity sensor that detects humidity, and an ambient light sensor that detects ambient light. It is to be noted that the sensor data may include information such as positional information (positional data) calculated from a GPS (Global Positioning System) signal or the like, and time information measured by a timer. In addition, the sensor data is not only sensor data acquired by the built-in sensor 104, but also sensor data acquired by an external sensor system or external equipment such as a smartphone.

The communication I/F 105 includes, for example, a communication interface circuit or the like. The communication I/F 105 accesses the server 20 coupled to the Internet 30 and exchanges various kinds of data under the control of the processor 101.

It is to be noted that, although not illustrated in FIG. 2, the voice processing device 10 may further include a display unit that displays various kinds of information (such as characters, images, and the like), an input unit that receives user operation, a storage unit that stores various kinds of data (such as audio data, text data, and the like), and the like.

Here, the display includes, for example, a liquid crystal display, an organic EL display, or the like. The input unit includes, for example, a button, a keyboard, or the like. Alternatively, the input unit may be configured as a touch-screen in which a touch sensor and the display unit are integrated with each other, and may receive an operation signal corresponding to operation performed by using a finger of the user or a stylus pen. The storage unit includes, for example, a flash memory which is a type of non-volatile memory, a DRAM (dynamic random-access memory) which is a type of volatile memory, or the like.

(Configuration Example of Server)

Figure 3:
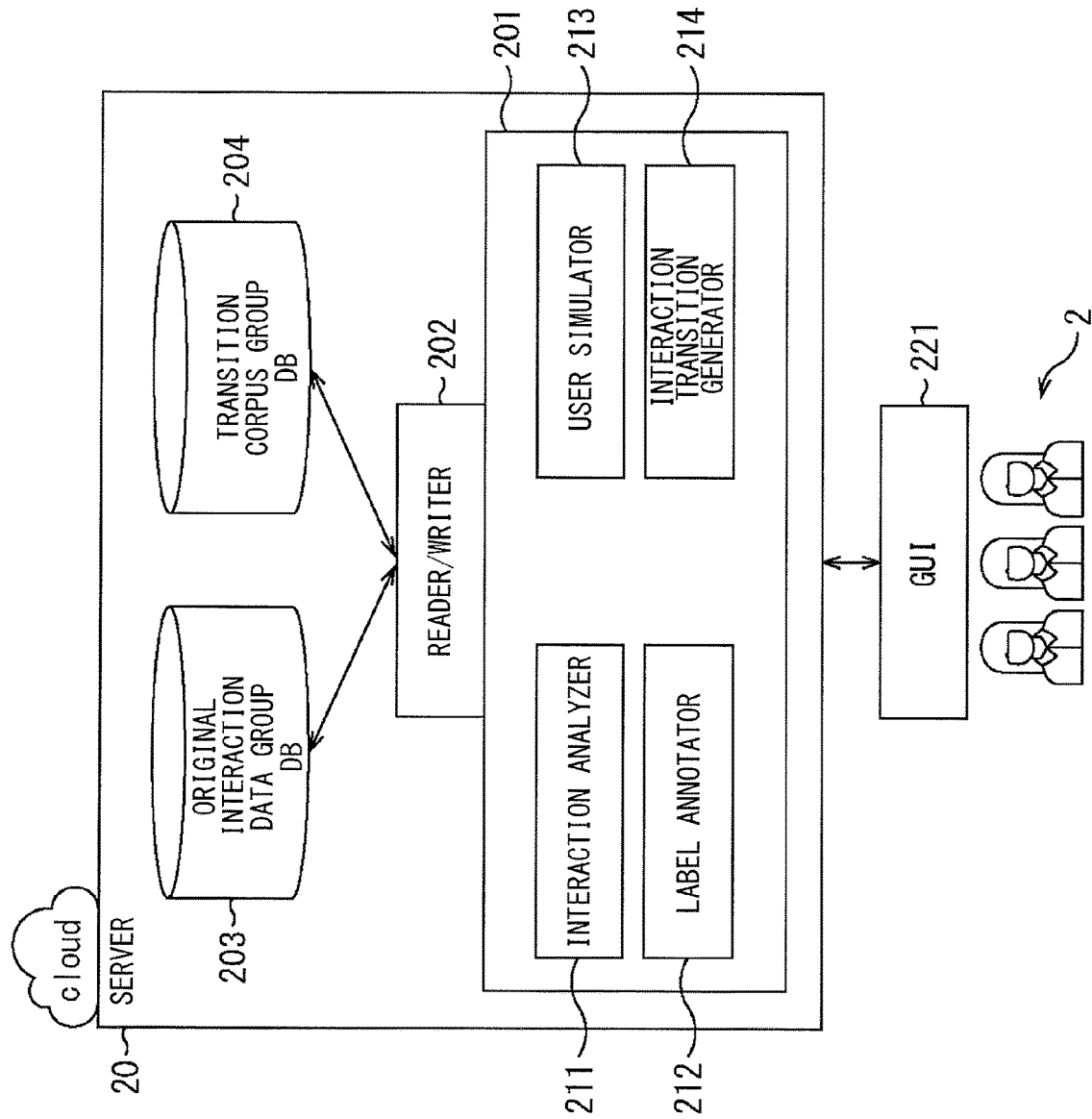
FIG. 3 is a block diagram illustrating a configuration of a server.

FIG. 3 is a block diagram illustrating a configuration example of the server 20 illustrated in FIG. 1.

With reference to FIG. 3, the server 20 includes a processor 201, a reader/writer 202, an original interaction data group DB 203, and a transition corpus group DB 204.

The processor 201 includes, for example, a CPU, a microprocessor, or the like. The processor 201 operates as a main processor in the server 20, such as various kinds of arithmetic processing and operation control of respective units. The processor 201 makes it possible to analyze a past interaction history and newly generate an interaction.

It is to be noted that, hereinafter, an interaction between a user and the system is also referred to as an "interaction transition". In addition, sometimes the voice interaction system 1 may be simply abbreviated as the "system".

The reader/writer 202 serves as an I/F (interface) that reads and writes data from and on a DB (database) under the control of the processor 201.

The original interaction data group DB 203 and the transition corpus group DB 204 are databases recorded on a large-capacity storage such as an HDD (hard disk drive).

The original interaction data group DB 203 stores much original interaction data that has not yet processed by an operator 2. The transition corpus group DB 204 stores many transition corpora that have already been present. In other words, it may be said that original transition data and the transition corpora are past interaction history information (interaction logs).

The processor 201 includes an interaction analyzer 211, a label annotator 212, a user simulator 213, and an interaction transition generator 214.

The interaction analyzer 211 performs analysis processing on data (for example, original interaction data or the like) read from the original interaction data group DB 203 or the transition corpus group DB 204. The interaction analyzer 211 outputs, to a GUI 221, data such as display information and statistical information obtained from an analysis result of the data.

Therefore, information such as the display information and the statistical information is presented to the GUI 221 on the basis of the data obtained from the interaction analyzer 211. It is to be noted that the information presented to the GUI 221 includes a GUI that supports design of an interaction transaction of the operators 2 or the like, for example. In other words, it may be said that the interaction analyzer 211 also has a function as a presenting unit that presents the GUI.

The label annotator 212 corrects an error in an interaction transition in response to operation performed by the operator 2 on the GUI 221. This makes it possible for the operator 2 to replace the label on the interaction transition with a correct label.

The user simulator 213 has a function of, for example, imitating behavior (utterance) of the user and artificially creating behavior (utterance). For example, in a case where the interaction transition generator 214 generates a new interaction transition, it is possible to use an artificial utterance generated by the user simulator 213.

The interaction transition generator 214 generates the new interaction transition, and causes the new interaction transition to be written on the transition corpus group DB 204 as a corpus.

Here, the interaction transition is generated on the basis of, for example, much original interaction data stored in the original interaction data group DB 203, data generated by the user simulator 213, operation performed by the operator 2 on the GUI 221, and the like. It is to be noted that, here, it is possible to additionally use other data such as sensor data obtained by the sensor 104 (FIG. 2), or the corpora stored in the transition corpus group DB 204.

The GUI 221 is a graphical user interface to be presented to a display device such as a liquid crystal display or an organic EL display, for example.

For example, the GUI 221 makes it possible to present information such as the display information or the statistical information to the operator 2 on the basis of the data obtained from the interaction analyzer 211. This makes it possible for the operator 2 to operate an input device such as a mouse, a keyboard, or a touchscreen, for example, while checking information on the GUI 221. Subsequently, the input operation is received.

It is to be noted that, as regards the server 20 illustrated in FIG. 3, the function of generating a corpus, which is provided as server-side service, has been mainly described in particular. However, the server 20 also has a voice recognition function (module), an interaction control function (module), and the like. For example, a corpus (interaction transition) that is newly stored in the transition corpus group DB 204 is used by the interaction control module for controlling an interaction.

In addition, although not illustrated in FIG. 3, the server 20 further includes a communication I/F such as a communication interface circuit. The server 20 is coupled to the voice processing device 10 via the Internet 30 to exchange various kinds of data.

In addition, FIG. 1 illustrates the case where the voice interaction system 1 includes the single server 20. However, it is also possible to install a plurality of the servers 20 for respective functions (for example, various kinds of modules such as a corpus generation module, a voice recognition module, and an interaction control module), for example.

In addition, for convenience of description, FIG. 1 illustrates the case where the voice interaction system 1 includes the single voice processing device 10. However, it is also possible to install a plurality of the voice processing devices 10 for respective users.

(Interaction Transition Generation Processing)

Figure 4:
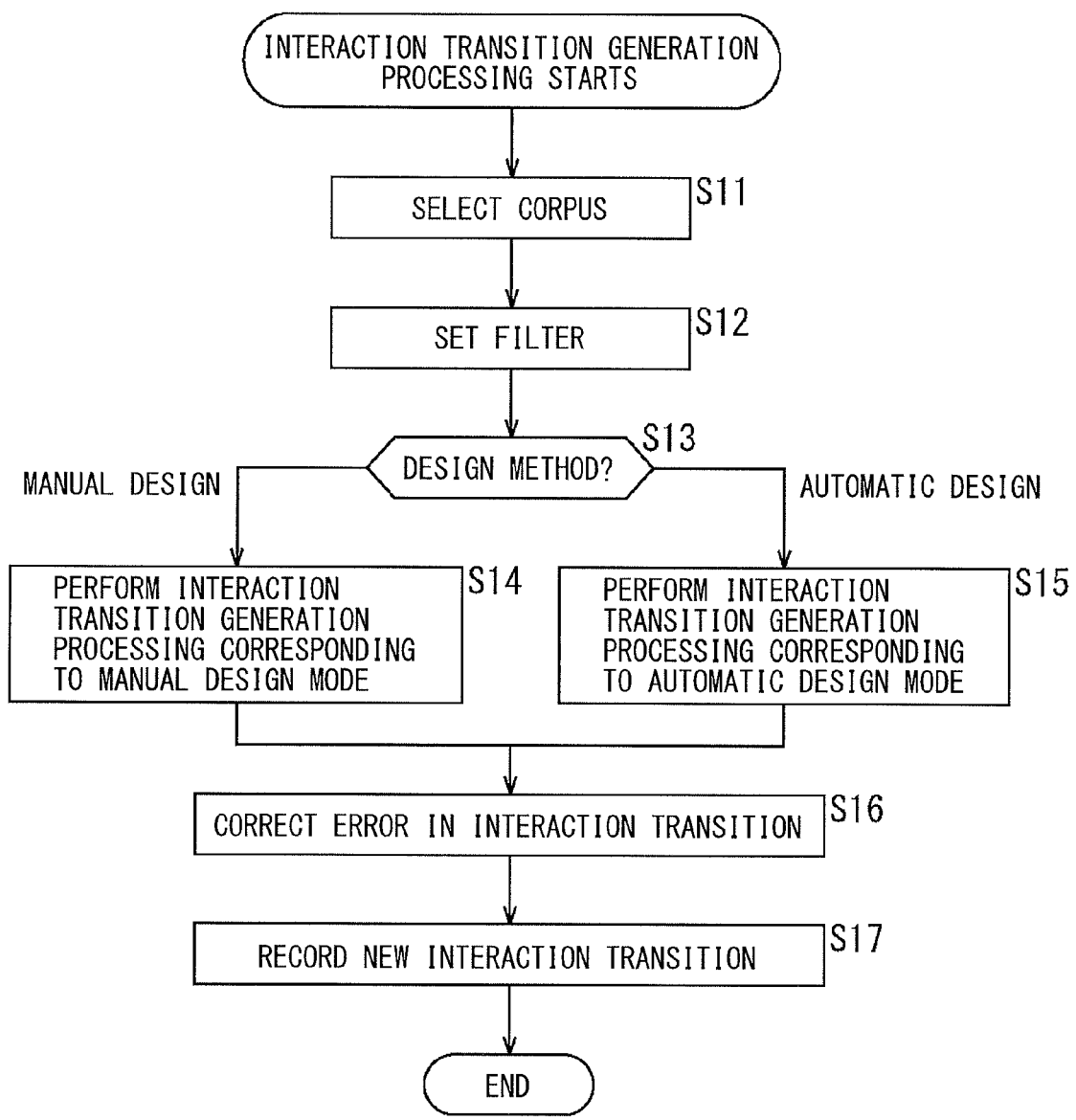
FIG. 4 is a flowchart for describing a flow of interaction transition generation processing.

Next, with reference to a flowchart illustrated in FIG. 4, a flow of interaction transition generation processing to be executed by the processor 201 of the server 20 is described.

It is to be noted that the interaction transition generation processing illustrated in FIG. 4 is executed by the processor 201 of the server 20 in response to an instruction from the operator 2 who operates the GUI 221, for example.

In Step S11, the processor 201 controls the reader/writer 202 and selects a corpus that is to be used by the operator 2, in response to operation performed by the operator 2.

Here, as the corpus, it is possible to select original interaction data that has not yet been processed by the operator 2 from the original interaction data group DB 203, or it is possible to select a transition corpus that has already been present from the transition corpus group DB 204.

In Step S12, the processor 201 sets a filter in response to operation performed by the operator 2.

Here, the filer is set for selecting which interaction transition is to be processed among various kinds of interaction transitions.

It is to be noted that the filter for the interaction transaction used here may include a condition regarding, for example, countries, regions, target users (such as a specific user or all users, for example), attributes of people (such as sexes, jobs, parents, or children, for example), time information such as date and time, types of applications such as a specific application, or the like.

In Step S13, the processor 201 selects a design method in response to operation performed by the operator 2.

Here, the design method regarding the interaction transition includes two design methods, which are "manual design" and "automatic design". According to the "manual design", the operator 2 manually designs the interaction transition. According to the "automatic design", (the server 20 of) the voice interaction system 1 designs the interaction transition on the basis of the statistical information or the like.

It is to be noted that, hereinafter, a case where the manual design is selected as the design method is referred to as a "manual design mode", and a case where the automatic design is selected as the design method is referred to as an "automatic design mode" among operation modes of (the processor 201 of) the server 20.

The processing proceeds to Step S14 in a case where the manual design is selected as the design method in Step S13. In this case, the processor 201 operates in the manual design mode.

In Step S14, the processor 201 performs interaction transition generation processing corresponding to the manual design mode.

In the interaction transition generation processing corresponding to the manual design mode, the interaction transition generator 214 generates an interaction transition in response to operation performed by the operator 2.

It is to be noted that, although detailed contents of the manual design mode is described in "(A) Manual Design Mode" below, the interaction analyzer 211 presents a GUI (interaction transition GUI) for designing an interaction transition. This makes it possible to support the operator 2 to design the interaction transaction.

Alternatively, the processing proceeds to Step S15 in a case where the automatic design is selected as the design method in Step S13. In this case, the processor 201 operates in the automatic design mode.

In Step S15, the processor 201 performs interaction transition generation processing corresponding to the automatic design mode.

In the interaction transition generation processing corresponding to the automatic design mode, the interaction transition generator 214 generates an interaction transition on the basis of statistical information or the like obtained from the interaction history information or the like.

It is to be noted that, although detailed contents of the automatic design mode is described in "(B) Automatic Design Mode" below, the interaction analyzer 211 presents a GUI (interaction transition GUI) for designing an interaction transition. This makes it possible to support the operator 2 to design the interaction transaction.

When the process in Step S14 or the process in Step S15 ends, the processing proceeds to Step S16.

In Step S16, the label annotator 212 of the processor 201 corrects an error in the interaction transition generated in the process in Step S14 or the process in Step S15, in response to operation performed by the operator 2.

Here, the interaction analyzer 211 causes presentation of a GUI (interaction transition GUI) for correcting the interaction transition. This makes it possible to support the operator 2 to correct the interaction transaction. It is to be noted that detailed contents of the correction of the interaction transaction is described later with reference to FIG. 7.

It is to be noted that, in a case where the interaction transition has no error, the process in Step S16 does not have to be performed. Accordingly, the process in Step S16 is skipped, and the processing proceeds to Step S17.

In Step S17, the processor 201 controls the reader/writer 202 and records the interaction transition newly generated through the above-described processes on the transition corpus group DB 204 in response to operation performed by the operator 2.

This makes it possible for the transition corpus group DB 204 to record (hold) the new interaction transition as a corpus, and then it becomes possible to use the new interaction transition as the corpus for a new transition. It is to be noted that, when the process in Step S17 ends, the interaction transition generation processing ends.

The flow of the interaction transition generation processing has been described above.

2. Embodiments of Present Technology (Integration of Plurality of Interaction Histories)

The user takes place an interaction with the system, which causes history information (interaction log) regarding the interaction to be accumulated. A method proposed by the present technology makes it possible to integrate and utilize a plurality of interactions.

Here, as an interaction history integration pattern, it is possible to freely use various kinds of integration patterns such as countries, regions, target users (such as a specific user or all users, for example), attributes of people (such as sexes, jobs, parents, or children, for example), time information such as date and time, or types of applications such as a specific application, for example. It is to be noted that the integration pattern may also be used as an interaction transition filter when the operator 2 performs an operation.

Figure 5:
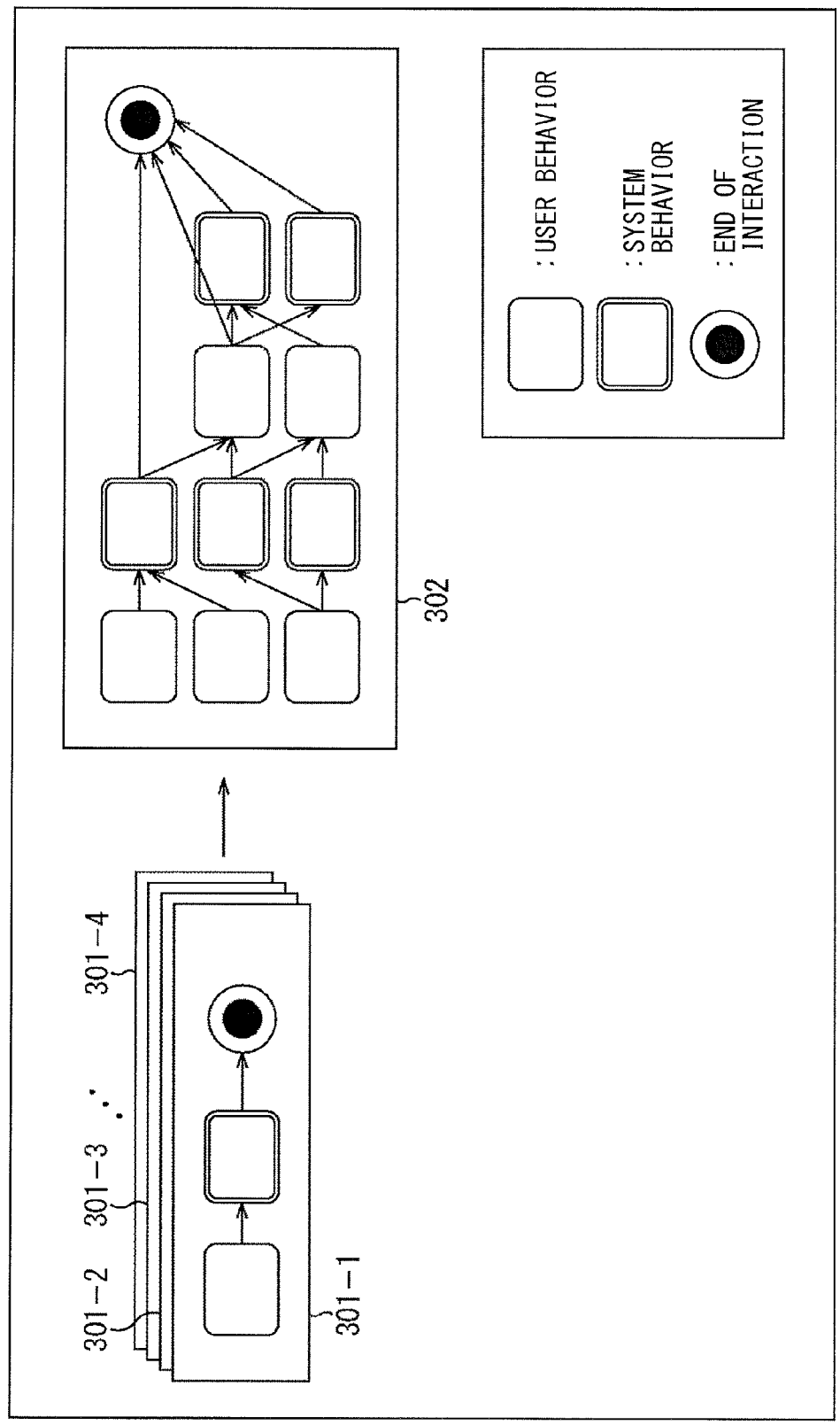
FIG. 5 is a diagram schematically illustrating an image of integration of user interaction histories.

FIG. 5 is a diagram schematically illustrating an image of integration of user interaction histories according to the present technology.

FIG. 5 illustrates a situation where pieces of interaction history data 301-1 to 301-*n* (n is an integer greater than or equal to 1) of a certain user are integrated to obtain an integrated interaction history 302.

Each piece of the interaction history data 301 includes "user behavior" indicating an utterance of the user and "system behavior" indicating an utterance of the system. It is to be noted that, hereinafter, utterances are used as an example of the "user behavior" and the "system behavior". However, the "user behavior" and the "system behavior" are not limited to the utterances. For example, the "user behavior" and the "system behavior" may include screen display, gesture, a change in facial expression, start of an application without any utterance, start of external service (for example, transmission of an e-mail or the like), and the like.

In FIG. 5, the "user behavior" is represented by a single-line rectangular frame, and the "system behavior" is represented by a double-line rectangular frame. In addition, in FIG. 5, an "end of interaction" is represented by a double circle with its inner circle painted black. It is to be noted that these signs means the same in other drawings described later.

For example, with reference to FIG. 5, the "user behavior" and the "system behavior" are coupled via an arrow in the piece of the interaction history data 301-1. This means that the system speaks in response to the utterance of the user. In addition, the "system behavior" is coupled to the "end of interaction". This means that the interaction ends after the system speaks.

In other words, as regards the piece of the interaction history data 301-1, a user utterance turn and a system utterance turn are done alternately. In a way similar to the piece of the interaction history data 301-1, each of the pieces of interaction history data 301-2 to 301-*n* includes a history of an interaction between the user and the system.

In FIG. 5, the pieces of interaction history data 301-1 to 301-*n* are integrated to generate the integrated interaction history 302.

In other words, in the integrated interaction history 302, any turns of any "user behavior" and any "system behavior" obtained from the pieces of interaction history data 301-1 to 301-*n* are coupled as indicated by arrows in the drawing, and they end with the "end of interaction".

As described above, integrating the pieces of interaction history data 301 makes it possible to generate, as the integrated interaction history 302, interaction transitions that do not exist in actual interactions between the user and the system.

It is to be noted that, as regards the integrated interaction history 302 illustrated in FIG. 5, the "user behavior" turns and the "system behavior" turns are alternately done. However, the turns may be randomly done in a manner that turns belonging to the "user behavior" or the "system behavior" are consecutively done, for example. In addition, the integrated interaction history 302 illustrated FIG. 5 indicates the case where the "end of the interaction" comes after the "system behavior". However, it is also possible to couple the "user behavior" with the "end of the interaction".

In addition, hereinafter, each of the "user behavior" and the "system behavior" is referred to as a "node", and a set of the "user behavior" and the "system behavior" is referred to as a "block". In other words, the "block" includes a plurality of the "nodes". It is to be noted that, here, each of the "user behavior" and the "system behavior" is referred to as the "node". Each of the nodes includes one or a plurality of contexts.

(Example of GUI)

Figure 6:
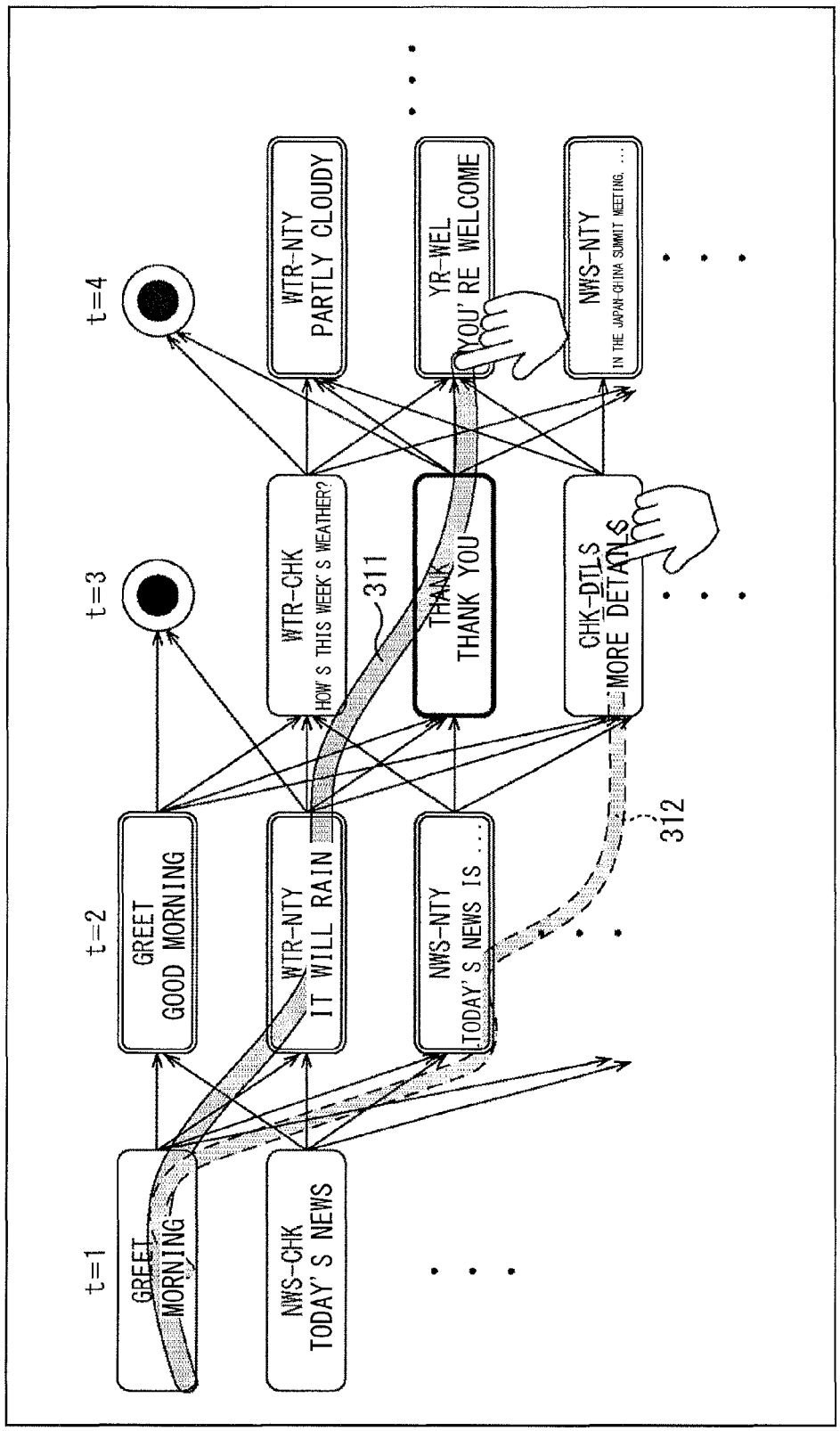
FIG. 6 is a diagram illustrating an example of an interaction transition GUI.

FIG. 6 illustrates an example of the interaction transition GUI as a GUI that utilizes the interaction transitions.

The interaction transition GUI is a GUI for designing the interaction transitions, and is a tool to be provided to the operator 2 on a system provision side. In addition, the interaction transition GUI is generated by the interaction analyzer 211 (FIG. 3), and is presented as the GUI 221 (FIG. 3).

With reference to FIG. 6, the interaction transition GUI aggregates and visualizes cases of interactions between the user and the system.

It is to be noted that, with reference to FIG. 6, "t='number'" in header indicates a turn number of interactions. The number is incremented as "user behavior" or "system behavior" is performed. In addition, each of the "user behavior" and the "system behavior" includes two rows of character strings. The character string in the upper row represents a symbol name of behavior, and the character string in the lower row represents an utterance case. It is to be noted that "t" is not limited to the turn number of interactions. For example, "t" may represent time on an actual time axis (for example, 2017/08/21 18:32:12 or the like). When time on the actual time axis is represented as described above, it is possible to easily recognize how much time is in between the respective behaviors, for example. The notation of "t" is optionally selectable.

For example, with reference to a node in the top row with regard to t=1, "GREET/MORNING" is written in two rows as "user behavior". In this case, the "GREET" in the upper row represents a symbol name of the behavior, and "MORNING" in the lower row indicates an utterance case.

Such as "MORNING", "GOOD MORNING", and "HI", there are many cases of utterance in response to the symbol. Therefore, only representative cases of utterance are described here. It is to be noted that, for example, cases of utterance that have happened often, or randomly selected cases of utterance are conceived as the representative cases of utterance.

In addition, in FIG. 6, an arrow that couples a "user behavior" node and a "system behavior" node represents a transition included in an actual interaction.

For example, with reference to nodes in the top row with regard to t=1 to 3, a "user behavior" node indicating "GREET/MORNING", a "system behavior" node indicating "GREET/GOOD MORNING", and an "end of interaction" are coupled. This means that an interaction actually takes place on a turn-by-turn basis in a manner that the system says "good morning" in response to "morning" from the user.

In addition, for example, with reference to nodes in the second and third rows from the top with regard to t=1 to 4, a "user behavior" node and a "system behavior" node are repeated in turn twice such as "NWS-CHK/TODAY'S NEWS", "NWS-NTY/TODAY'S NEWS IS . . . ", "WTR-CHK/HOW'S THIS WEEK'S WEATHER?", and "WTR-NTY/PARTLY CLOUDY".

This means that the actual interactions take place in a manner that the system says "today's news is . . . " in response to the utterance "today's news" of the user, and then the system says "partly cloudy" in response to the question "how's this week's weather?" from the user.

Here, it is also possible to sequentially select the respective "user behavior" nodes or the respective "system behavior" nodes through the interaction transition GUI illustrated in FIG. 6. For example, the operator 2 makes it possible to operate a mouse or a touchscreen and select a desired route by drawing a line over the respective nodes along a selection route 311 or a selection route 312 illustrated in FIG. 6.

For example, a "user behavior" node and a "system behavior" node are selected in turn twice along the selection route 311 such as "GREET/MORNING", "WTR-NTY/IT WILL RAIN", "THANK/THANK YOU", "YR-WEL/YOU'RE WELCOME".

In such a way, it is possible to generate, as an interaction transition, an interaction that is not included in the actual interactions, in a manner that the system says "it will rain" in response to the utterance "morning" of the user, and then the system says "you're welcome" in response to the utterance "thank you" of the user.

Alternatively, for example, "user behavior" nodes and a "system behavior" node are sequentially selected along the selection route 312 such as "GREET/MORNING", "WTR-NTY/TODAY'S NEWS IS . . . ", "CHK-DTLS/MORE DETAILS".

In such a way, it is possible to generate an interaction that is not included in actual interactions, in a manner that the system says "today's news is . . . " in response to the utterance "morning" of the user, and then the system speaks in response to the utterance "more details" of the user.

It is to be noted that, here, it is assumed that a "system behavior" node selected after the "user behavior" node (hereinafter, such a node to be noticed is referred to as a "node of interest") indicating "CHK-DTLS/MORE DETAILS" has low reliability.

In other words, for example, in a case where the "system behavior" node indicating "WTR-NTY/PARTLY CLOUDY" is selected after the node of interest of "CHK-DTLS/MORE DETAILS", the conversation seems to suddenly become the topic of weather irrespective of the flow of interaction. This result in low reliability. In this case, transition to an interaction transition GUI illustrated in FIG. 7 takes place. This makes it possible to select a more suitable node.

Figure 7:
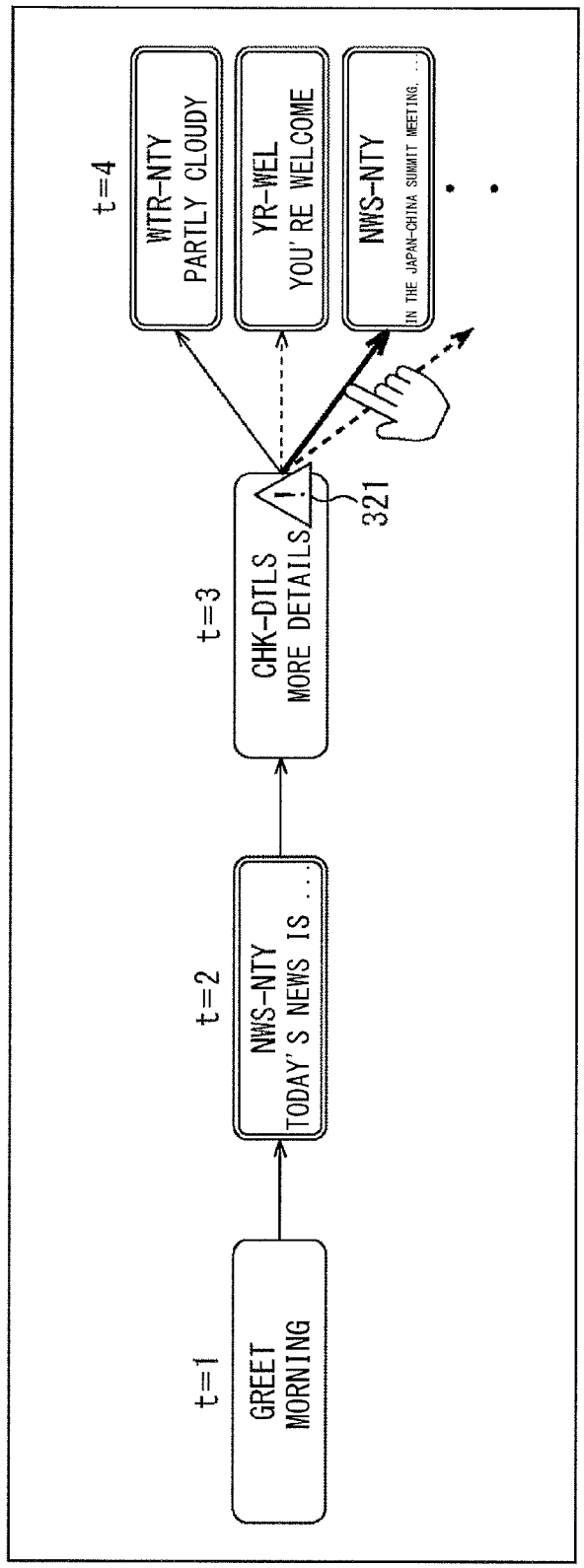
FIG. 7 is a diagram illustrating an example of an interaction transition GUI used in a case where a coupling destination node has low reliability.

With reference to FIG. 7, the interaction transition GUI is an interface that causes another screen or the like to show interaction transitions corresponding to selected nodes by actually selecting some nodes. In addition, the "system behavior" node having low reliability is selected; therefore, the interaction transition visualizes the low reliability.

It is to be noted that, hereinafter, a candidate node in response to the node of interest is also referred to as a "candidate node", and the selected node is referred to as a "selection node". In addition, a node coupled to the node of interest is also referred to as a "coupling node".

Specifically, in FIG. 7, in a case where "system behavior" candidate nodes indicating "WTR-NTY/PARTLY CLOUDY", "YR-WEL/YOU'RE WELCOME", AND "NWS-NTY/IN THE JAPAN-CHINA SUMMIT MEETING, . . . " are selectable in response to the node of interest indicating "CHK-DTLS/MORE DETAILS", the "system behavior" node indicating "WTR-NTY/PARTLY CLOUDY", which is remotely related to the node of interest, is selected as a selection node.

At this time, the "system behavior" node indicating "WTR-NTY/partly cloudy", which is remotely related to the node of interest, is selected as the selection node; therefore, a warning icon 321 is presented to notify the operator 2 that this is a transition having low reliability.

In addition, in FIG. 7, for example, the candidate node indicating "NWS-NTY/IN THE JAPAN-CHINA SUMMIT MEETING, . . . " is expected to be an optimal candidate node to be coupled to the node of interest indicating "CHK-DTLS/MORE DETAILS", and a thick arrow that prompts the operator 2 to select this candidate node is presented. This makes it possible for the operator 2 to comply with suggestion from the system and select the candidate node indicating "NWS-NTY/IN THE JAPAN-CHINA SUMMIT MEETING, . . . " as the selection node (in other words, it is possible to allocate a correct node).

As a result, the "user behavior" node and the "system behavior" node are selected in turn twice along the selection route 312 illustrated in FIG. 6, such as "GREET/MORNING", "WTR-NTY/TODAY'S NEWS IS . . . ", "CHK-DTLS/MORE DETAILS", AND "NWS-NTY/IN THE JAPAN-CHINA SUMMIT MEETING, . . . ".

Here, in a case where an appropriate candidate node is presented as a coupling node to be coupled to the node of interest, it is possible to consider information obtained from the interaction history information (interaction logs) or the like, for example.

Specifically, it is possible to generate (present) the candidate node on the basis of detailed information regarding (context included in) the node of interest, information related to (context included in) the node of interest, information that is not related to (context included in) the node of interest, repetition information regarding (context included in) the node of interest, or statistical information (for example, frequency or the like) obtained from the interaction history information or the like, for example.

This makes it possible to correct an interaction transition having low reliability, and generate a corpus of an interaction transition having high reliability that is usable as data for machine learning or the like, for example.

It is to be noted that, at this time, in a case where there is no appropriate candidate node to be presented in response to the node of interest, a node indicating that "no corresponding utterance" may be added, or the operator 2 may newly add a candidate node, for example.

For example, it is sufficient if a GUI or the like for inputting information regarding a new candidate node is presented in a case where the interaction transition GUI illustrated in FIG. 7 displays a "plus button icon" or the like for newly adding the candidate node, and this icon is operated.

Figure 8:
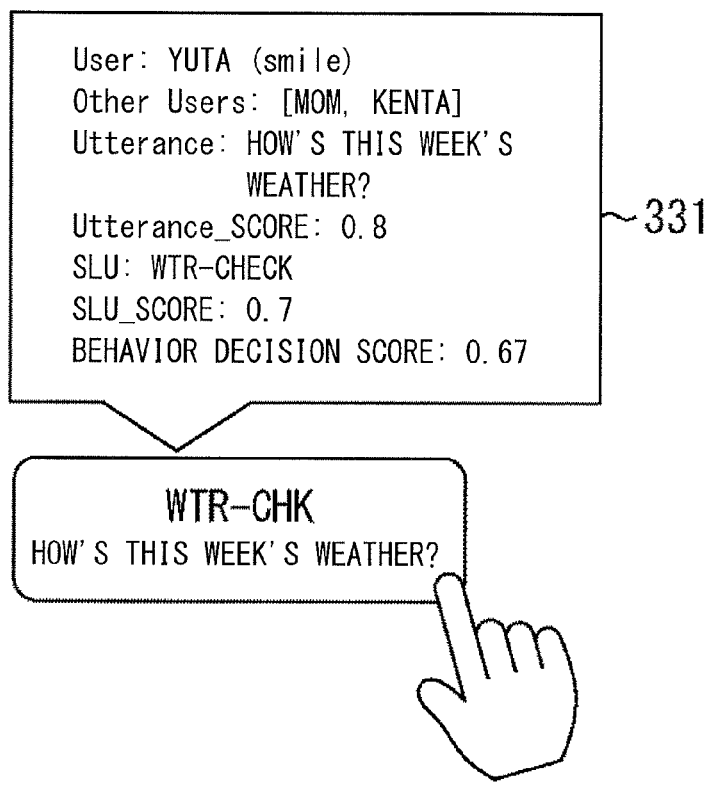
FIG. 8 a diagram illustrating a display example of detailed information regarding a node.

In addition, the interaction transition GUI may present detailed information regarding each of the "user behavior" nodes and "system behavior" nodes. FIG. 8 illustrates a display example of the detailed information regarding a node.

FIG. 8 schematically illustrates a situation where, upon selecting the "user behavior" node indicating "WTR-CHK/HOW'S THIS WEEK'S WEATHER?", detailed information of this is displayed.

The detailed information of this node may include a user who has actually behaved, a state of the user, surrounding users, a voice recognition result (Utterance), and a score of the voice recognition result, a semantic analysis result (SLU: spoken language understanding), a score of the semantic analysis result, a score for deciding behavior to be actually performed by the system on the basis of a recognition result thereof, an ambient environment, and the like, for example.

Specifically, in a speech balloon 331 in FIG. 8, detailed information of the node includes "YUTA" as a user, includes "(smile)" as his state, and includes "MOM" and "KENTA" as surrounding users (Other Users).

In addition, the speech balloon 331 includes "HOW'S THIS WEEK'S WEATHER?" as a voice recognition result (Utterance), includes "0.8" as a score (Utterance_score) of the voice recognition result, includes "WTR-CHECK" as a semantic analysis result (SLU), includes "0.7" as a score (SLU_score) of the semantic analysis result, and includes "0.67" as a behavior decision score.

It is to be noted that, although FIG. 8 exemplifies the detailed information regarding the "user behavior" node, it is possible to present detailed information regarding a "system behavior" node in a similar way. In addition, for example, the detailed information regarding the user, his/her states, surrounding users, and the like is presented on the basis of an analysis result of sensor data obtained from the sensor 104 (FIG. 2).

In addition, it is also possible for the interaction transition GUI illustrated in FIG. 6 and FIG. 7 to present information such as a moving image or a still image of the user on the basis of the sensor data obtained from the sensor 104 (FIG. 2). This makes it possible for the operator 2 to operate the interaction transition GUI while checking the utterances of the user and the situation where the user has actually given the utterances with use of the moving image or the like.

It is to be noted that, in a case where the moving image or the still image of the user is presented in such a way, it is possible to protect privacy of the user by displaying an avatar of the user, covering a portion of the eyes of the user with a black line, or manipulating the image through pixelization or blurring, for example.

(Creation of Interaction Scene)

It is possible to create a virtual interaction (interaction scene) by generating an interaction transition using the above-described interaction transition GUI. Here, as described above, the generation of an interaction transaction is roughly classified into two modes, which are the manual design mode and the automatic design mode. Next, the respective design modes are described.

(A) Manual Design Mode

First, the manual design mode is described. In the manual design mode, the interaction transition generator 214 generates an interaction transition by selecting nodes one by one from among certain nodes through the interaction transition GUI.

At this time, as a function of supporting the operator 2 (support function), the interaction transition GUI makes it possible to provide a function of visualizing a route to actually access selected nodes in a case where the nodes are selected.

Figure 9:
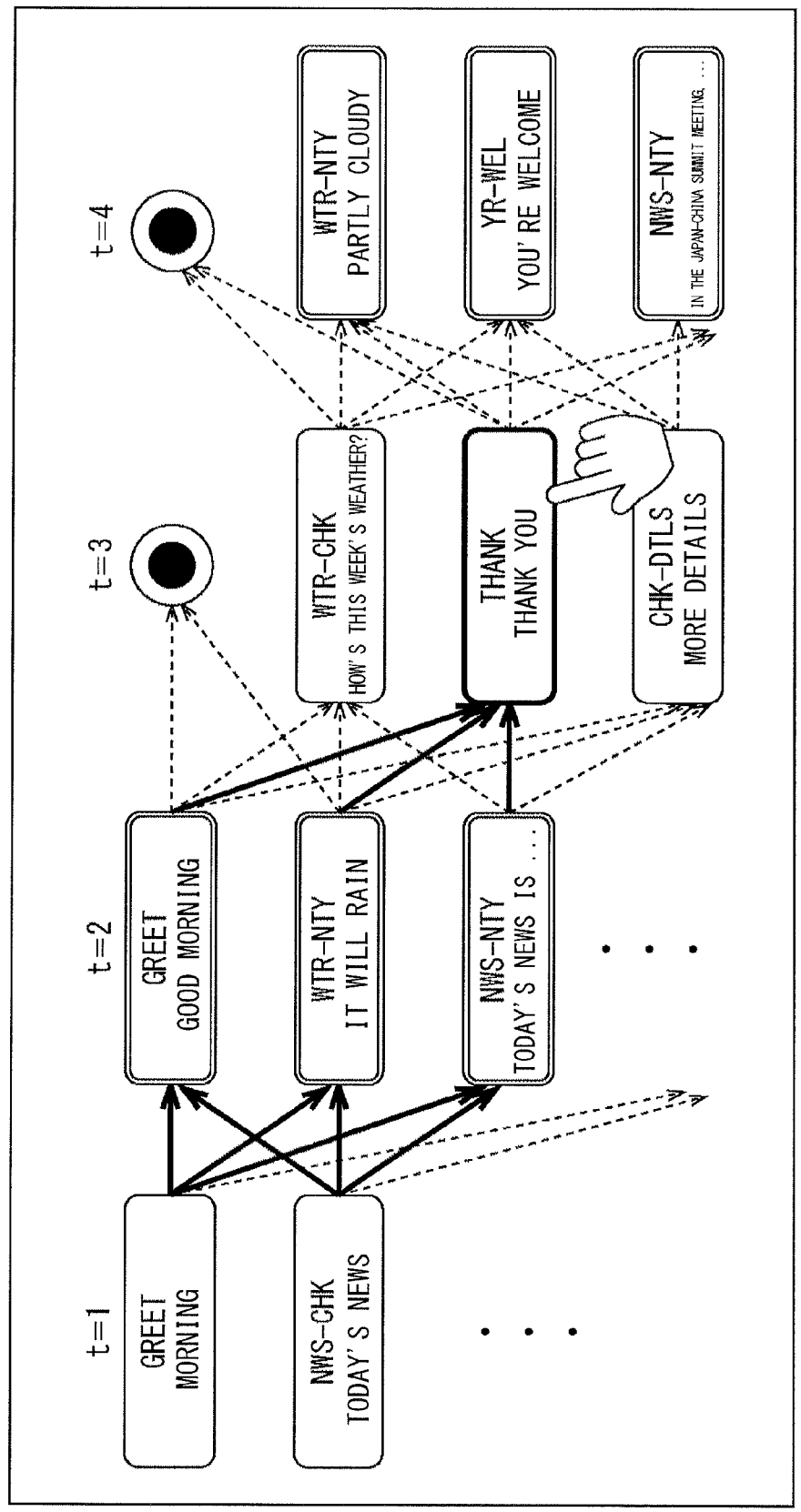
FIG. 9 is a diagram illustrating an example of an interaction transition GUI that visualizes access routes to nodes.

FIG. 9 is a diagram illustrating an example of the interaction transition GUI that visualizes access routes to nodes.

In FIG. 9, the interaction transition GUI visualizes access routes to nodes selected by the operator 2.

Specifically, in FIG. 9, the operator 2 operates the GUI 221 by using, for example, a mouse to select a "user behavior" node (selection node) indicating "THANK/THANK YOU".

At this time, as indicated by thick arrows in FIG. 9, routes are visualized in a manner that the "user behavior" node indicating "GREET/MORNING" is coupled to the respective "system behavior" nodes indicating "GREET/GOOD MORNING", "WTR-NTY/IT WILL RAIN", and "WTR-NTY/TODAY'S NEWS IS . . . ", and each of the "system behavior" nodes is coupled to the selection node indicating "THANK/THANK YOU".

In a similar way, routes are also visualized in a manner that the "user behavior" node indicating "NWS-CHK/TODAY'S NEWS" is coupled to the respective "system behavior" nodes indicating "GREET/GOOD MORNING", "WTR-NTY/IT WILL RAIN", and "WTR-NTY/TODAY'S NEWS IS . . . ", and each of the "system behavior" nodes is coupled to the selection node indicating "THANK/THANK YOU".

As described above, in a case where the operator 2 selects a desired node, scenarios for accessing the selection node from a certain node as a starting point are generated on the basis of past interaction history information (interaction logs). Each of the scenarios serves as one of actual node transitions, and this results in generation of interaction transitions.

For example, a route is visualized in a case where the operator 2 selects a "user behavior" node (selection node) indicating "Play music", which is different from the nodes illustrated in FIG. 9. This makes it possible to easily recognize which nodes (contexts) exist before the selection node. Therefore, it is possible to generate an interaction transition by selecting an interaction route that is not actually present but is possibly present.

It is to be noted that the operator 2 operates the GUI 221 by using, for example, the mouse, the touchscreen, or the like, which makes it possible to freely insert a "user behavior" node or a "system behavior" node into any turn.

At this time, the operator 2 may decide any behavior (utterance) with regard to the "system behavior", or may artificially continue the behavior (utterance) by using the user simulator 213. It is to be noted that details of a method of artificially continuing the behavior (conversation) by using the user simulator 213 are described later.

In addition, the operator 2 may set a symbol name of "user behavior" manually, or the symbol name of "user behavior" may be allocated by using an analyzer used in an actual system.

(B) Automatic Design Mode

Next, the automatic design mode is described. In the automatic design mode, the operator 2 does not have to manually select the nodes one by one, but the interaction transition generator 214 generates (automatically generates) interaction transitions through various kinds of methods.

Here, five methods are exemplified as methods of automatically generating an interaction transition. Hereinafter, first to fifth methods are described. However, the methods described below are mere examples, and it is also possible to automatically generate an interaction transition by using any other method.

(First Method)

The first method is a method of mixing actual interaction transitions in a case where there are a plurality of actual interaction transitions.

For example, as regards t=1 to 3, a first interaction transition and a second interaction transition are assumed. The first interaction transition includes a "user behavior" node A, a "system behavior" node B, and a "user behavior" node C that transition in this order. The second interaction transition includes the "user behavior" node A, the "system behavior" node B, and a "user behavior" node D that transition in this order.

In this case, it is possible to recognize not only the actual interaction transitions such as the first interaction transition and the second interaction transition, but also routes transitionable between nodes on the basis of interaction history information or the like regarding the actual interactions. This makes it possible to generate interaction transitions from the "user behavior" nodes and the "system behavior" nodes included in the transitionable routes.

It is to be noted that, in the above-described examples, it is also possible to increase the number of interaction transitions to be generated, for example, by interchange of nodes in certain interaction turns (such as t=3), or the like in a case where analysis processing is performed on the actual interaction transitions such as the first interaction transition and the second interaction transition.

As described above, the interaction transition generator 214 makes it possible to generate many interaction transitions by mixing a plurality of actual interaction transitions on the basis of past interaction history information (interaction logs).

(Second Method)

The second method is a method of virtually selecting second and subsequent candidate nodes other than a first candidate node, as candidate nodes in response to a node of interest.

Here, at each turn, the system basically selects, as a selection node (coupling node to be coupled to the node of interest), a candidate node to be a first candidate from among candidate nodes obtained from a plurality of nodes. However, in the second method, second and subsequent candidate nodes that are not selected as the first candidate are temporarily selected.

At this time, at a turn that comes after the temporarily selected node, the node may be coupled to the "end of interaction" to end, or the interaction between the user and the system may continue as it is.

Here, for example, a temporarily selected candidate node (such as a "system behavior" node) transitions to a most frequently coupled node (such as a "user behavior" node). This makes it possible to continue the interaction between the user and the system.

It is to be noted that, here, it is also possible to use the user simulator 213 and artificially continue utterances by concurrently using, for example the forth method described later at turns that come after the temporarily selected candidate node.

For example, in a case where an interaction in five turns between the user and the system has taken place, it is assumed that when the system has given an "utterance about music" in the last node, a second candidate node for the last node indicates an "utterance about news". In this case, the node indicates the "utterance about news" is temporarily selected as the second candidate node, and the interaction about the news between the user and the system continues at six and subsequent turns. This makes it possible to increase the number of interaction transitions to be generated.

As described above, the interaction transition generator 214 makes it possible to generate many interaction transitions by virtually selecting, as the candidate nodes in response to the node of interest, the second and subsequent candidate nodes other than the first candidate node on the basis of past interaction history information (interaction logs).

(Third Method)

The third method is a method of extending an interaction without proceeding to an end node indicating the "end of the interaction" in an interaction transition.

Here, the access to the end node indicating the "end of the interaction" means that the user actually ends the interaction. However, in the third method, the node continues (is extended) on the assumption that the user virtually continues the behavior (utterance) after the end of the interaction.

In this case, as the node to be extended, another utterance may be selected as an utterance of the user, for example, or an utterance of the user may be decided from among similar interaction transitions.

In addition, in such a case, a module having a function of virtually generating behavior (an utterance) of the user is the user simulator 213 used in the fourth method described later, and it is possible to concurrently use the third method and the fourth method described later.

Figure 10:
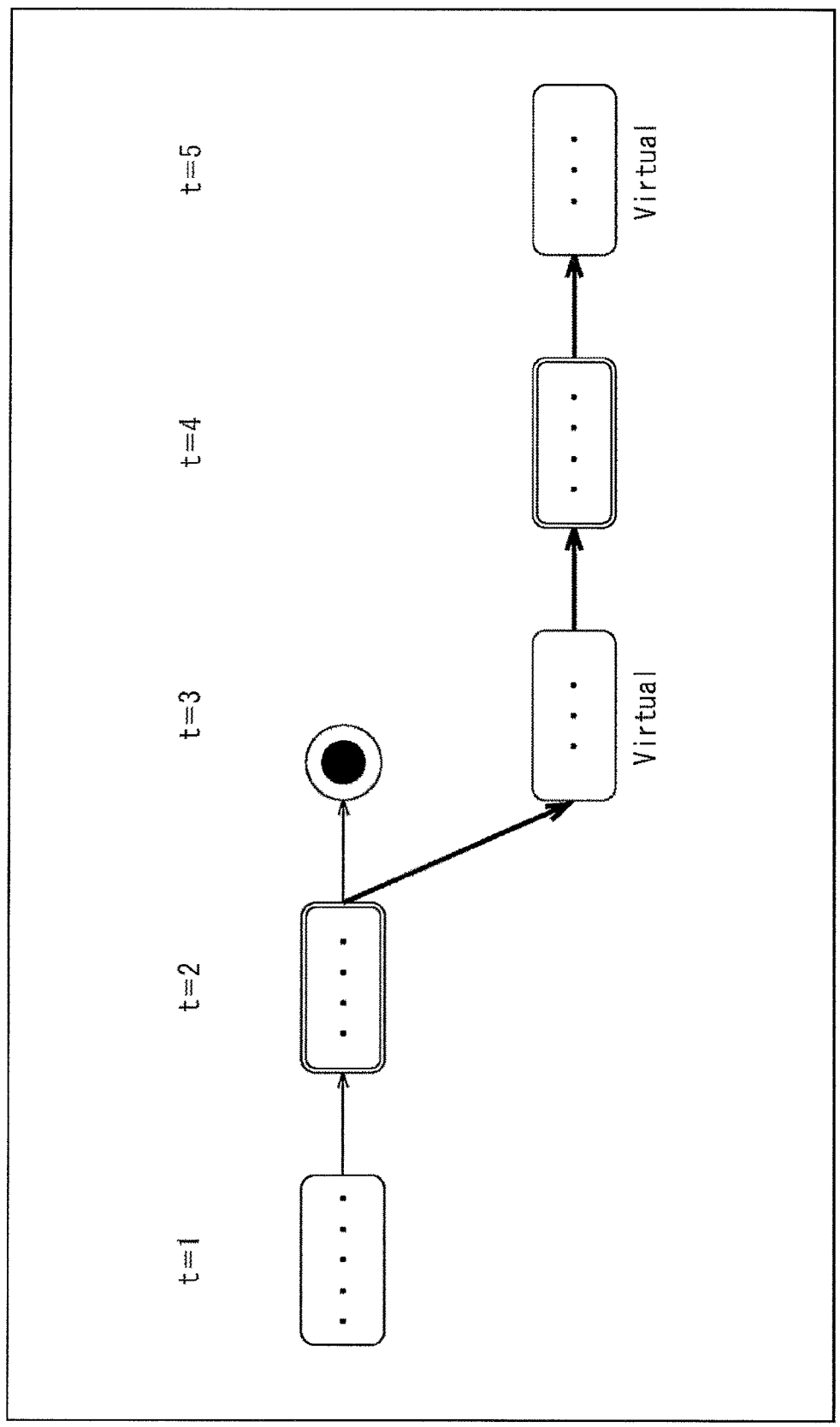
FIG. 10 is a diagram illustrating an example of extending an interaction by using a user simulator.

Here, FIG. 10 illustrates an example of extending an interaction by using the user simulator 213.

In FIG. 10, an interaction is taken place between the user and the system in turn once, and the interaction ends in the next turn (t=3). At this time, as represented by thick arrows in FIG. 10, the user simulator 213 artificially generates a (virtual) node indicating an utterance of the user at t=3, the interaction between the user and the system continues, and the system speaks at t=4.

Subsequently, a node (virtual) indicating an utterance of the user is artificially generated in a similar way. This makes it possible to virtually continue the interaction between the user and the system even in a case where the actual interaction between the user and the system has ended.

In addition, in the example illustrated in FIG. 10, the interaction continues in a case where the "end of the interaction" comes after the "system behavior" node. However, the node immediately before the "end of the interaction" may be a "user behavior" node.

Figure 11:
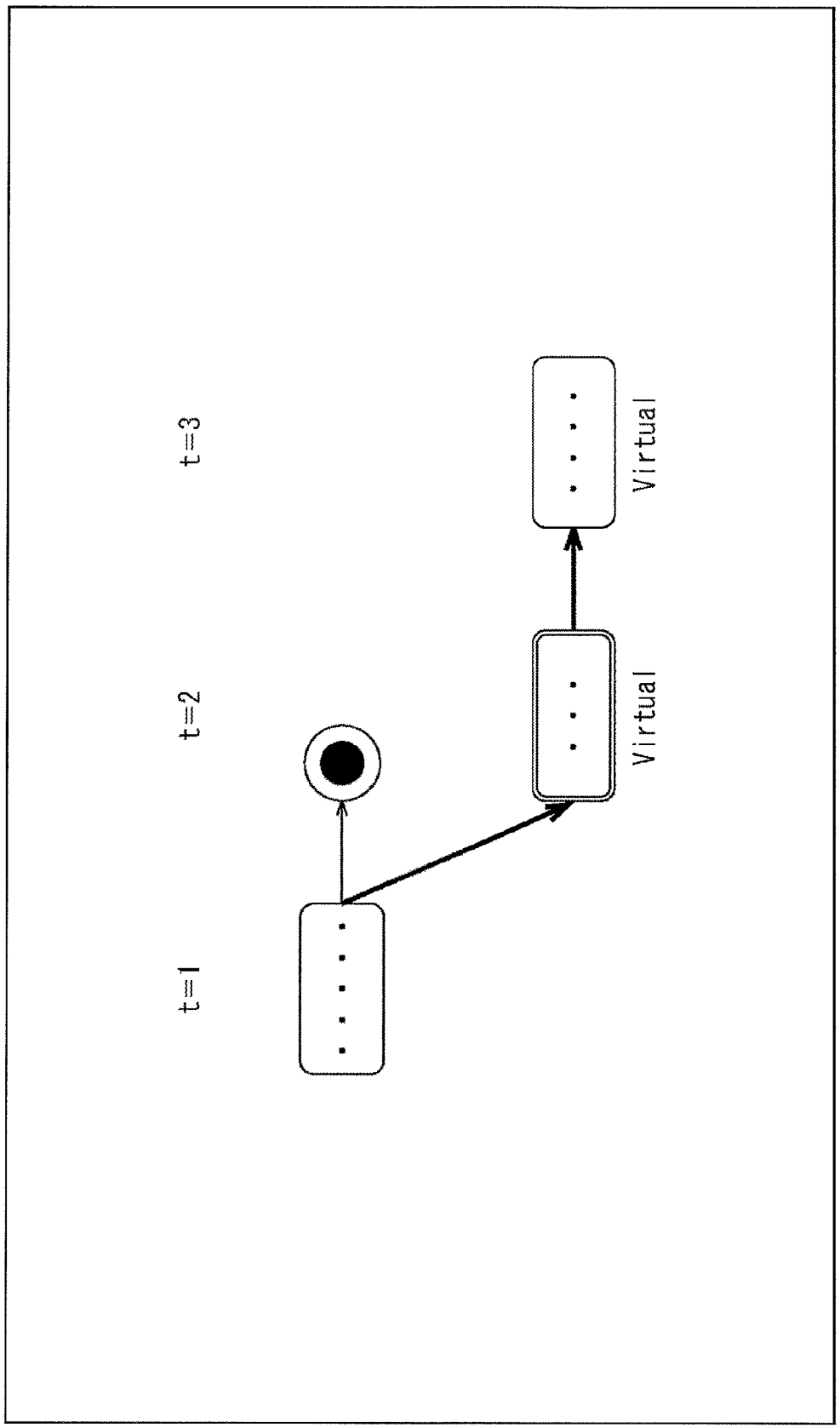
FIG. 11 is a diagram illustrating an example of extending an interaction by using the user simulator.

FIG. 11 illustrates an example of extending an interaction by using the user simulator 213 in a case where the node immediately before the "end of the interaction" is a "user behavior" node.

In FIG. 11, an interaction is taken place between the user and the system over several turns, and the interaction ends after an utterance of the user. At this time, as represented by thick arrows in FIG. 11, the user simulator 213 artificially and alternately generates a node (virtual) indicating an utterance of the system and a node (virtual) indicating an utterance of the user, which makes it possible to virtually continue the interaction between the user and the system.

As described above, the interaction transition generator 214 makes it possible to generate many interaction transitions by extending interactions without accessing the end node indicating an "end of the interaction" in an interaction transition.

(Fourth Method)

The fourth method is a method of artificially generating utterances with use of the user simulator 213 to virtually continue an interaction between the user and the system.

It is to be noted that, as described above, it is possible to use the fourth method concurrently with the second method, the third method, or another method.

Here, a simulation to be executed by the user simulator 213 is a model of guessing a next utterance that is most likely to be given by the user. For example, the model may be represented by the following expression (1) where u is a past utterance of the user, s is an utterance of the system, and θ is another parameter.

$$P(u4|u1,u2,u3,\ldots,s1,s2,s3,s4,\theta) \qquad (1)$$

It is to be noted that, in the expression (1), P indicates conditional probability. Here, P indicates the probability that the user gives the utterance u4 (which is supposed to be given by the user now) under a certain condition.

In addition, in the expression (1), "u1, u2, u3" corresponds to a history of past utterances of the user, and "s1, s2, s3, s4" corresponds to a history of past utterances of the system. In addition, the other parameter θ includes, for example, a voice recognition error rate, a semantic analysis error rate, a behavior decision error rate, or the like.

In addition, in the expression (1), the history of the past utterances of the user includes actual utterances of the user and artificial utterances generated by the user simulator 213. It is to be noted that the interaction between the user and the system is not limited to a one-to-one interaction. The interaction may be taken place among the system and a plurality of users.

Here, for example, by changing the condition for the expression (1), probabilities for utterances u4, u4', u4", ... that are supposed to be given by the user are sequentially determined. Therefore, it is sufficient if an utterance having the highest probability among the utterances u4, u4', u4", ... is outputted as a final utterance that is supposed to be given by the user. Next, the interaction transition generator 214 makes it possible to generate an interaction between the user and the system by using the utterance (for example, the utterance u4 or the like) that has been artificially generated by the user simulator 213.

It is to be noted that, although the example in which the user simulator 213 artificially generates utterances of the user has been described here, it is also possible to generate artificial utterances of the system in a similar way.

As described above, the interaction transition generator 214 makes it possible to simulatively reproduce utterances of the user by using the user simulator 213, and generate many interaction transitions by virtually continuing interactions between the user and the system.

(Fifth Method)

The fifth method is a method of coupling nodes indicating utterances of the user or the system in units of blocks.

Figure 12:
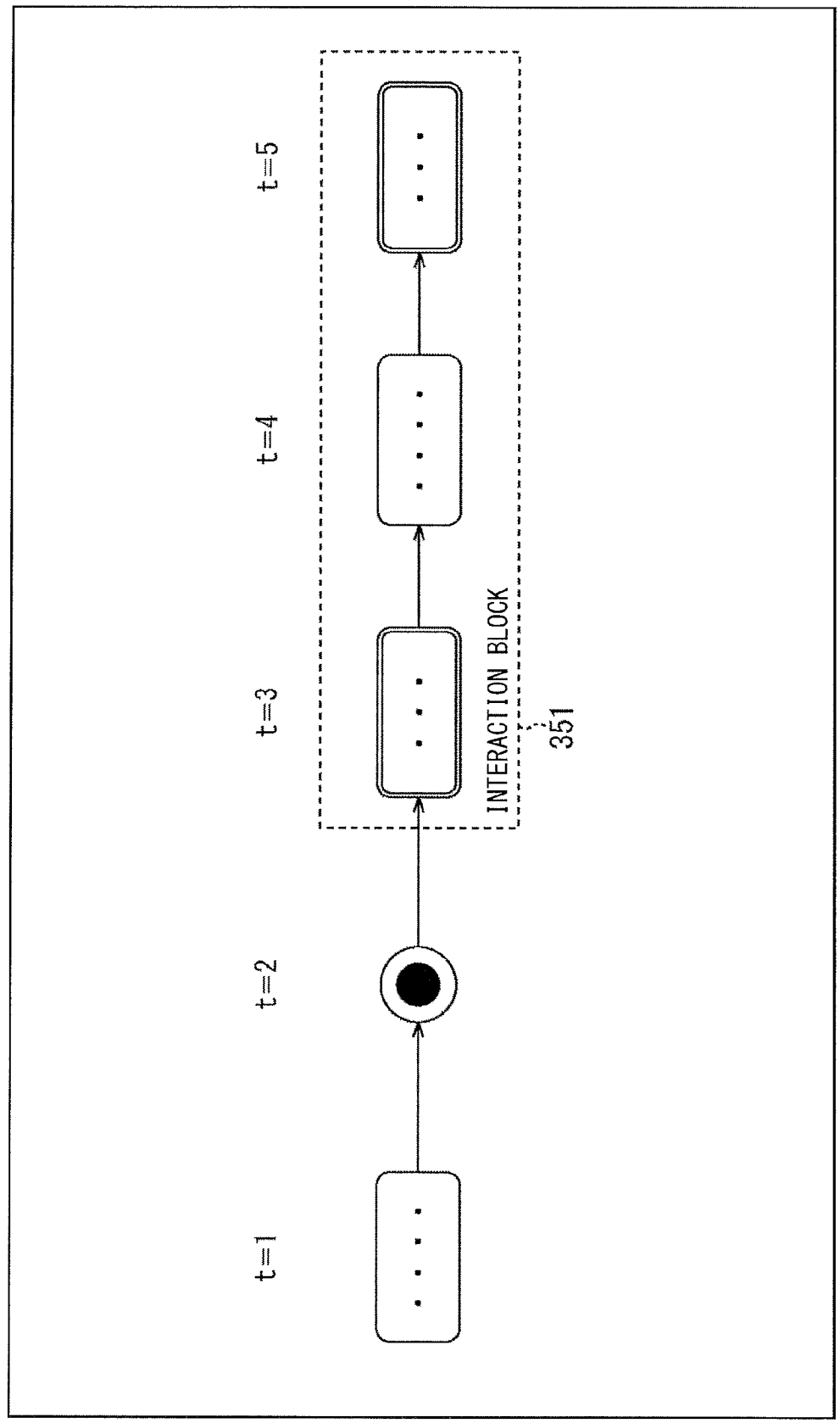
FIG. 12 is a diagram illustrating an example of coupling in units of interaction blocks.

FIG. 12 illustrates an example of coupling a node of interest to a block (interaction block) of an interaction including a plurality of nodes.

FIG. 12 schematically illustrates an image in which, in a case where there is a "user behavior" node immediately before a node indicating an "end of an interaction", and an interaction block 351 including three nodes is further coupled to the node indicating the "end of the interaction". The interaction block 351 includes, for example, nodes indicating utterances belonging to a certain common category such as an interaction regarding music, sport, or the like between the user and the system.

In this case, it is possible to smooth the flow of the interaction between the user and system by inserting, for example, a conjunction such as "in addition" or "by the way" as an utterance of "system behavior" when coupling the interaction block 351.

For example, in a case where a node that comes immediately before the "end of the interaction" includes a content related to music in an interaction between the user and the system, it is sufficient if the interaction block 351 including a plurality of nodes corresponding to an interaction regarding detailed contents related to the music is coupled to the node that comes immediately before the "end of the interaction". In this case, the interaction block 351 to be coupled is related to a topic common to the node that comes immediately before the "end of the interaction"; therefore, inserting a conjunction such as "in addition" and then coupling the interaction block 351 makes it possible to smooth the flow of the interaction.

Alternatively, for example, in a case where a node that comes immediately before the "end of the interaction" includes a content related to music in an interaction between the user and the system, it is also possible to couple the interaction block 351 including a plurality of nodes corresponding to an interaction regarding contents related to sport to the node that comes immediately before the "end of the interaction". In this case, the interaction block 351 to be coupled is related to a topic that is not related to the node that comes immediately before the "end of the interaction"; therefore, inserting a conjunction such as "by the way" and then coupling the interaction block 351 makes it possible to smooth the flow of the interaction.

Here, in a case where it is possible to couple a plurality of interaction blocks to a node of interest, it is possible to couple an appropriate interaction block to the node of interest in consideration of, for example, information obtained from the interaction history information (interaction logs) or the like and.

Specifically, it is possible to generate an interaction block to be coupled on the basis of detailed information regarding (context included in) the node of interest, information related to (context included in) the node of interest, information that is not related to (context included in) the node of interest, repetition information regarding (context included in) the node of interest, or statistical information (for example, frequency or the like) obtained from the interaction history information or the like, for example.

It is to be noted that the interaction block 351 is not only coupled to a node. It is also possible to couple interaction blocks to each other.

Figure 13:
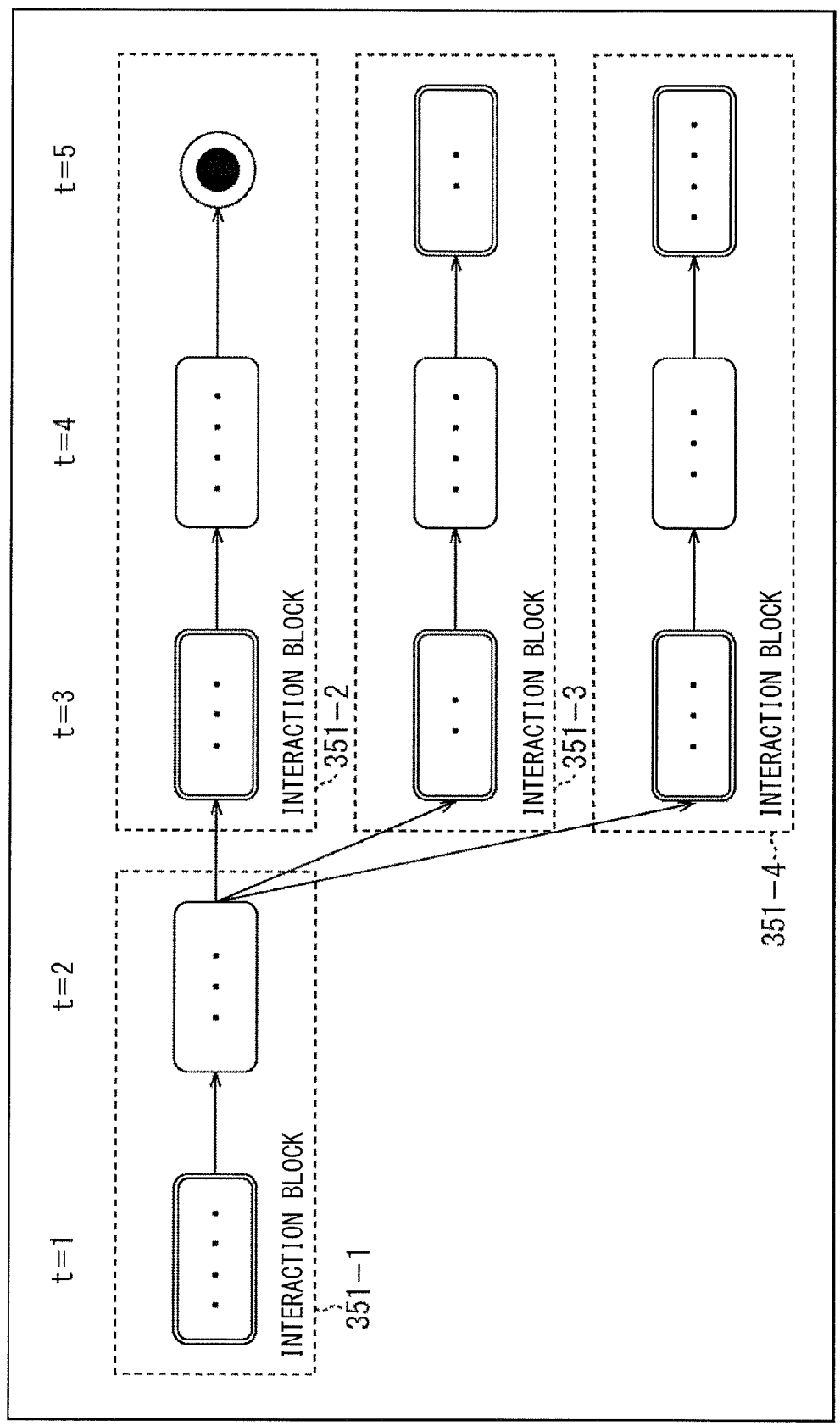
FIG. 13 is a diagram illustrating an example of coupling in units of interaction blocks.

FIG. 13 illustrates an example of coupling an interaction block (interaction block of interest) including a plurality of nodes to an interaction block (candidate interaction block) including a plurality of nodes.

In FIG. 13, it is possible to couple three candidate interaction blocks 351-1 to 351-3 to an interaction block 351-1. In this case, for example, it is possible to refer to couple an appropriate interaction block to the interaction block 351-1 in consideration of information obtained from the interaction history information (interaction logs) or the like.

Specifically, it is possible to generate an interaction block to be coupled on the basis of detailed information regarding (context included in nodes of) an interaction block of interest, information related to (context included in nodes of) the interaction block of interest, information that is not related to (context included in nodes of) the interaction block of interest, repetition information regarding (context included in nodes of) the interaction block of interest, or statistical information (for example, frequency or the like) obtained from the interaction history information or the like, for example.

For example, in the example illustrated in FIG. 13, if statistical information indicating that the interaction block 351-2 is frequently coupled to the interaction block 351-1 is obtained, the interaction block 351-2 is selected and coupled to the interaction block 351-1.

As described above, the interaction transition generator 214 makes it possible to generate many interaction transitions by coupling nodes not only in units of nodes but also in units of blocks.

It is to be noted that, in the automatic design mode, it is possible to present the operator 2 with a GUI such as the interaction transition GUI by the GUI 221, or it is possible to generate many interaction transitions and record them as corpora on the transition corpus group DB 204 on the basis of decision made by the system (such as decision made by the processor 201) only, without presenting the GUI such as the interaction transition GUI. In this case, it is possible for the system to randomly couple a node to a node, a node to an interaction block, or an interaction block to an interaction block.

(Examples of Various Nodes)

In the above description, the node basically means an utterance. However, as regards a multimodal interaction, the user behavior and the system behavior are not limited to the utterances. For example, the processor 201 of the server 20 makes it possible to analyze sensor data obtained by the sensor 104 (FIG. 2) included in the voice processing device 10 and recognize behavior of the user other than utterances with use of a result of the analysis.

Here, it is possible to recognize, for example, behavior such as leaving, hand waving, nodding, or a yawn as behavior of the user, and incorporate the behavior as a node. In contrast, as behavior of the system, it is possible to incorporate behavior such as shutting down of equipment such as the voice processing device 10, reproduction of music, or display of a still image or a moving image, for example.

As described above, according to the present technology, it is possible to generate many interaction transitions in the manual design mode or the automatic design mode. This makes it possible to generate interaction data with less cost.

Here, as described above, it is necessary to use sufficient interaction data in a case of making a high-performance interaction agent. A lot of manpower and time are necessary to collect much interaction data and to generate data of interaction scenarios customized for particular purposes, which results in a huge amount of cost. In contrast, application of the present technology makes it possible to generate many interaction transitions in the manual design mode or the automatic design mode. This makes it possible to generate interaction data with less cost. As a result, it is possible to easily make the high-performance interaction agent.

3. Modification Examples

In the above description, the GUI such as the interaction transition GUI is presented as the GUI 221 in the server 20 on the cloud side, and the GUI is operated by the operator 2. However, it is also possible to present (a GUI having a function equivalent to) the GUI such as the interaction transition GUI to (the display of) the local voice processing device 10 on the local side, and such a GUI may be operated by a user.

For example, a user operating the voice processing device 10 may access a voice interaction service support page through an application or a browser installed in a terminal, and use a function such as the interaction transition GUI as a tool that performs feedback (for example, a tool for correcting errors in an interaction transition or the like). It is to be noted that, in this case, it is necessary to limit information accessible for the user to information regarding his/her own utterances only.

In addition, in the above description, the case of processing text data of utterances of the user has been described. However, it is also possible to process not only the text data of utterances of the user but also, for example, text data of a text chat or the like. In this case, the voice processing device 10 makes it possible to present, for example, information corresponding to the text data or image data as a system response from the server 20.

4. Configuration of Computer

Figure 14:
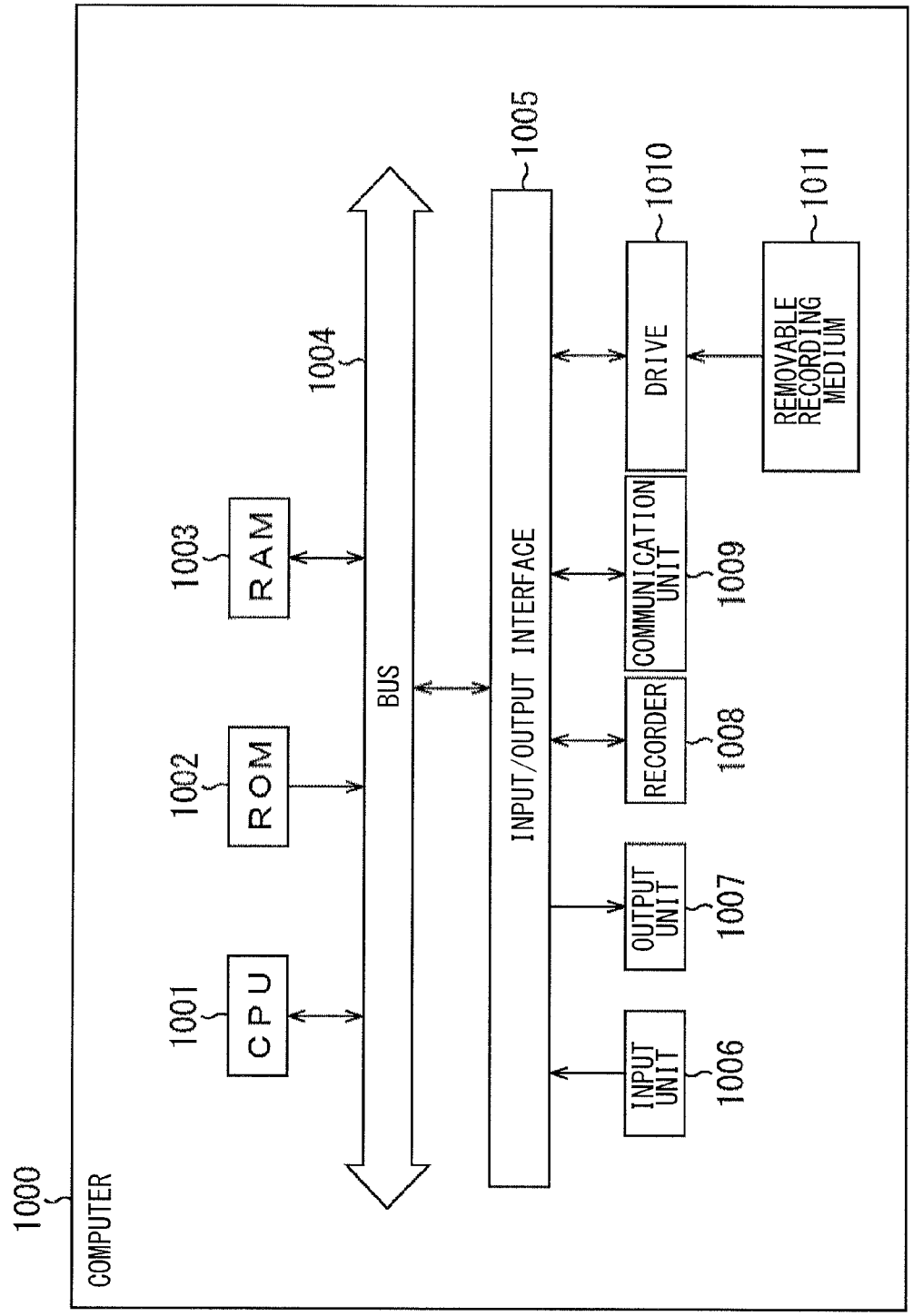
FIG. 14 is a diagram illustrating a configuration example of a computer.

It is possible to execute the above-described series of processes (for example, the interaction transition generation processing illustrated in FIG. 4) by hardware or software. In a case where the series of processes is executed by software, a program included in the software is installed in a computer of each device. FIG. 14 is a block diagram illustrating a configuration example of hardware of a computer that executes the above-described series of processes by a program.

In a computer 1000, a CPU (central processing unit) 1001, a ROM (read-only memory) 1002, and a RAM (random access memory) 1003 are coupled to each other via a bus 1004. In addition, an input/output interface 1005 is further coupled to the bus 1004. An input unit 1006, an output unit 1007, a recorder 1008, a communication unit 1009, and a drive 1010 are coupled to the input/output interface 1005.

The input unit 1006 includes a keyboard, a mouse, a microphone, and the like. The output unit 1007 includes a display, a speaker, and the like. The recorder 1008 includes a hard disk, a non-volatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads a program recorded, for example, on the ROM 1002 or the recorder 1008 onto the RAM 1003 through the input/output interface 1005 and the bus 1004, and executes the program, thereby performing the above-described series of processes.

It is possible to record the program executed by the computer 1000 (the CPU 1001) onto, for example, the removable recording medium 1011 such as a package medium for supply. In addition, it is possible to supply the program via a wired or wireless transmission medium such as a local area network, the Internet, or digital broadcasting.

In the computer 1000, it is possible to install the program in the recorder 1008 via the input/output interface 1005 by mounting the removable recording medium 1011 on the drive 1010. In addition, it is possible for to receive the program in the communication unit 1009 via the wired or wireless transmission medium and install the program in the recorder 1008. In addition, it is possible to install the program in advance in the ROM 1002 or the recorder 1008.

Here, in the present specification, the processing executed by the computer in accordance with the program may not necessarily be executed chronologically in the order described as a flowchart. That is, the processing executed by the computer in accordance with the program also includes processes executed in parallel or individually (for example, parallel processes or processes by objects). In addition, the program may be processed by one computer (processor) or may be distributed to a plurality of computer and processed by the plurality of computers.

It is to be noted that the embodiments of the present technology are not limited to those described above but may be modified in various ways without departing from the scope of the present technology. For example, the present technology may take on a cloud computing configuration in which a plurality of devices share the load and collaborate in processing a single function via a network.

Further, for example, it is possible for the present technology to adopt a configuration of cloud computing in which one function is distributed to a plurality of devices via a network and processed in cooperation. In addition, in a case where a plurality of processes is included in one step, it is possible to execute the plurality of processes included in the one step by one device, and it is possible to distribute the plurality of processes to a plurality of devices for execution.

It is to be noted that the present technology may also have the following configurations.

(1)

An information processing device including:

a processor that generates, on the basis of interaction history information, a coupling context to be coupled to a context of interest to be noticed among a plurality of contexts.

(2)

The information processing device according to (1), in which the processor presents the coupling context.

(3)

The information processing device according to (2), in which the processor presents a candidate context that is a candidate for the coupling context.

(4)

The information processing device according to any one of (1) to (3), in which the interaction history information includes a history of interaction between a user and a voice interaction system, and the plurality of contexts is obtained from the interaction history information.

(5)

The information processing device according to (4), in which the processor generates the coupling context on the basis of detailed information, related information, non-related information, or repetition information regarding the context of interest obtained from the interaction history information, or statistical information obtained from the interaction history information.

(6)

The information processing device according to (5), in which the processor generates the coupling context in units of nodes or in units of blocks, each of the nodes including one or a plurality of contexts, and each of the blocks including a plurality of nodes.

(7)

The information processing device according to any one of (1) to (6), in which the processor receives correction on the coupling context.

(8)

The information processing device according to (5), in which the processor generates the coupling context on the basis of artificial interaction information obtained by using a simulator that simulatively reproduces an utterance of the user.

(9) The information processing device according to any one of (1) to (8), in which the processor generates the coupling context on the basis of the interaction history information and sensor information obtained from a sensor.

(10) The information processing device according to (4), in which
one or the plurality of contexts obtained from the interaction history information is included in a node, and
the processor adds a node corresponding to behavior of the user or the voice interaction system to an interaction transition including a plurality of the nodes.

(11) The information processing device according to (10), in which the processor generates the node corresponding to the behavior of the user or the voice interaction system, on the basis of sensor information obtained from a sensor.

(12) An information processing method that is performed by an information processing device, the method including:
generating, on the basis of interaction history information, a coupling context to be coupled to a context of interest to be noticed among a plurality of contexts.

REFERENCE SIGNS LIST

1: voice interaction system
10: voice processing device
20: server
30: Internet
101: processor
102: microphone
103: speaker
104: sensor
201: processor
202: reader/writer
203: original interaction data group DB
204: transition corpus group DB
211: interaction analyzer
212: label annotator
213: user simulator
214: interaction transition generator
1000: computer
1001: CPU

The invention claimed is:

1. An information processing device comprising:
a processor configured to:
generate, on a basis of interaction history information that includes a history of interactions between a customer and a voice interaction system, the voice interaction system providing system interactions in response to customer interactions, a coupling context to be coupled to a context of interest among a plurality of contexts obtained from the interaction history information;
calculate probabilities of a plurality of different content of a future customer interaction with the voice interaction system based on a plurality of contexts obtained from the interaction history information;
generate a customer interaction of the future customer interaction according to the content calculated to have the highest probability;
display the generated customer interaction of the future customer interaction to the customer through a graphical user interface;
receive an input from the customer in response to the display of the generated customer interaction;
generate a coupling context between the generated customer interaction of the future customer interaction and at least one of the plurality of contexts used to calculate the probabilities based on the received input from the customer, each coupling context being generated in units of nodes and in units of blocks each of the nodes including one or more contexts, and each of the blocks including a plurality of nodes;
determine whether first content for a first plurality of nodes in a first block is different from second content for a second plurality of nodes in the first block; and
insert a conjunction to couple the first plurality of nodes to the second plurality of nodes based on the determination.

2. The information processing device according to claim 1, wherein the processor is further configured to present the coupling context.

3. The information processing device according to claim 2, wherein the processor is further configured to present a candidate context that is a candidate for the coupling context.

4. The information processing device according to claim 1, wherein the processor is further configured to generate the coupling context on a basis of detailed information, related information, non-related information, or repetition information regarding the context of interest obtained from the interaction history information, or statistical information obtained from the interaction history information.

5. The information processing device according to claim 4, wherein the processor is further configured to receive correction on the coupling context.

6. The information processing device according to claim 4, wherein the processor is further configured to generate the coupling context on a basis of artificial interaction information obtained by using a simulator that simulatively reproduces an utterance of the customer.

7. The information processing device according to claim 1, wherein the processor is further configured to generate the coupling context on a basis of the interaction history information and sensor information obtained from a sensor.

8. The information processing device according to claim 1, wherein
one or the plurality of contexts obtained from the interaction history information is included in a node, and
the processor is further configured to add a node corresponding to behavior of the user or the voice interaction system to an interaction transition including a plurality of the nodes.

9. The information processing device according to claim 8, wherein the processor is further configured to generate the node corresponding to the behavior of the customer or the voice interaction system, on a basis of sensor information obtained from a sensor.

10. An information processing method that is performed by an information processing device, the method comprising:
generating, on a basis of interaction history information that includes a history of interactions between a customer and a voice interaction system, the voice interaction system providing system interactions in response to customer interactions, a coupling context to be coupled to a context of interest among a plurality of contexts obtained from the interaction history information;

calculating probabilities of a plurality of different content of a future customer interaction with the voice interaction system based on a plurality of contexts obtained from the interaction history information;

generating a customer interaction of the future customer interaction according to the content calculated to have the highest probability;

displaying the generated customer interaction of the future customer interaction to the customer through a graphical user interface;

receiving an input from the customer in response to the display of the generated user customer interaction;

generating a coupling context between the generated customer interaction of the future customer interaction and at least one of the plurality of contexts used to calculate the probabilities based on the received input from the customer, each coupling context being generated in units of nodes and in units of blocks, each of the nodes including one or more contexts, and each of the blocks including a plurality of nodes:

determining whether first content for a first plurality of nodes in a first block is different from second content for a second plurality of nodes in the first block: and inserting a conjunction to couple the first plurality of nodes to the second plurality of nodes based on the determination.

* * * * *